US012257682B2

(12) United States Patent
Yang

(10) Patent No.: US 12,257,682 B2
(45) Date of Patent: Mar. 25, 2025

(54) HIGH-SPEED GUNPOWDER ACTUATED NAIL WITH A TOOTHED TUBE

(71) Applicant: PREGUN INDUSTRIAL CO., LTD., Taichung (TW)

(72) Inventor: Wen-Chang Yang, Taichung (TW)

(73) Assignee: PREGUN INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 18/240,566

(22) Filed: Aug. 31, 2023

(65) Prior Publication Data

US 2025/0033177 A1 Jan. 30, 2025

(30) Foreign Application Priority Data

Jul. 28, 2023 (TW) ................................ 112128285

(51) Int. Cl.
*B25C 1/12* (2006.01)

(52) U.S. Cl.
CPC .................................. *B25C 1/126* (2013.01)

(58) Field of Classification Search
CPC ..................................................... B25C 1/126
USPC ............................................................. 227/9
See application file for complete search history.

(56) References Cited

U.S. PATENT DOCUMENTS 3,048,849 A * 8/1962 De Caro ................. F41A 15/04 411/440
3,060,437 A * 10/1962 Ivins ....................... B25C 1/143 227/9
3,074,070 A * 1/1963 Wolf ......................... B25C 1/16 227/9
3,249,279 A * 5/1966 Behrend ................. F16B 19/14 227/10
3,395,843 A * 8/1968 Kvavle ................... B25C 1/082 60/632
3,559,272 A * 2/1971 Hsu ......................... B25C 1/087 29/432
3,577,921 A * 5/1971 Van Langenhoven ....................... F41A 19/56 102/431
3,658,008 A * 4/1972 Larson ...................... F42B 5/18 102/431
3,690,536 A * 9/1972 Bakoledis ............... B25C 1/143 227/10
3,823,668 A * 7/1974 Remaly ................... F42B 5/184 102/433

(Continued)

*Primary Examiner* — Thomas M Wittenschlaeger
*Assistant Examiner* — Katie L Gerth
(74) *Attorney, Agent, or Firm* — MUNCY, GEISSLER, OLDS & LOWE, P.C.

(57) ABSTRACT

A high-speed gunpowder actuated nail with a toothed tube includes: a nail member including an outer threaded portion; a tubular member including an inner threaded portion screwed to the outer threaded portion; an actuating portion mounted to the tubular member; and a percussion cap mounted to an end of the tubular member remote from the nail member. As such, it can be applied for effective screw connection of a threaded rod of small size, and the threaded rod and the nail member are arranged to be perpendicular to each other so that it has high structural strength, which improves the assembly strength to solve the difficulty and high cost of processing the inner thread of the tubular portion of the conventional one-piece high-speed nail, and solve the problem of insufficient screw connection strength due to the insufficient teeth of the conventional hanger.

9 Claims, 8 Drawing Sheets

(56) References Cited

U.S. PATENT DOCUMENTS

| | | | | | |
|---|---|---|---|---|---|
| 4,000,697 | A * | 1/1977 | Levine | F42B 5/184 | 102/700 |
| 4,830,254 | A * | 5/1989 | Hsu | B25C 1/18 | 227/156 |
| 5,332,140 | A * | 7/1994 | Almeras | B25C 1/188 | 227/8 |
| 5,497,929 | A * | 3/1996 | Armstrong | B25C 1/16 | 411/440 |
| 2010/0270351 | A1* | 10/2010 | Lee | B25C 1/126 | 89/1.14 |
| 2016/0131463 | A1* | 5/2016 | Stauffer | F42B 8/12 | 102/515 |
| 2020/0039045 | A1* | 2/2020 | Lee | B25C 1/143 | |

* cited by examiner

HIGH-SPEED GUNPOWDER ACTUATED NAIL WITH A TOOTHED TUBE

BACKGROUND OF THE INVENTION

Field of the Invention

The present invention relates to a high-speed gunpowder actuated nail with a toothed tube.

Description of the Prior Art

There are two conventional ways for installing pipes or metal frames to the ceiling. The first way is to use a high-speed nail provided with a tubular portion having an inner thread, a threaded rod is screwed to the tubular portion, and threaded rod can be assembled with an object; however, the disadvantage of the first way is that the high-speed nail integrally formed with the tubular portion having the inner thread is only suitable for being provided with ⅜" UNC teeth or M8 teeth or the teeth classified above M8 teeth, because the tubular portion becomes harder after forging, so it is unsuitable for tapping a nail, even after annealing, to form a thread classified below ¼" UNC thread or M6 thread, so there has never been a high-speed nail integrally formed with a tubular portion having an internal thread on the market.

The second way is to use a hanger having an internal thread, the nail member is connected to the hanger and nailed into the ceiling, and then a threaded rod is screwed to the hanger. FIG. 6 shows the commonly hanger having a M6 internal thread. The hanger 81 is formed by sheet punching to form a hole and a flange 82 thereon, and then the flange 82 is tapped to form the internal thread. The bottom of the nail member 83 includes a power load with plastic barrel 84 to provide propelling power. This kind of hanger has the following disadvantages. (1) The wastage of metal material during producing the hanger 81 is extremely high, which is nearly 50% higher than that during producing the hanger in the first way. (2) The cost of material of the power load with plastic barrel is high. (3) The high temperature and high pressure of injection molding for producing the hanger 81 will consume a lot of electricity. (4) The number of teeth of the internal thread of flange 82 is generally 2 to 2.5 so that the teeth is seriously insufficient so that it can easily lead to insufficient pulling force and cause disengagement of the threaded rod, and it is impossible to obtain a qualified certification.

The third way is to use a hanger having a ¼" UNC internal thread as shown in FIG. 7. The hanger 91 is formed by stamping the hanger 91 back and forth to form a semi-circular flange 92, and the semi-circular flange 92 is tapped to include the internal thread. The hanger 91 is used and cooperates with a nail member 93 and a power load 94 having a copper shell specially used for American ceiling guns. This kind of hanger has the following disadvantages. (1) The wastage of metal material during forming the semi-circular flange 92 of the hanger 91 is extremely expensive, which is nearly 60% higher than that in the first way. (2) The copper material used in the copper shell of the power load 94 is extremely expensive, and it takes about 1 ton of copper material for every a million grains of the power load 94. (3) The cost of transporting the hangers 91 and the power loads 94 is about 60% more than that of the first way. (4) The semi-circular flange 92 does not be entirely fitted to the threaded rod, resulting in incomplete screw connection and resulting in insufficient pulling force of the hanger 91 and disengagement of the threaded rod, so that it is impossible to obtain a qualified certification. (5) The tapped thread is not provided with an electroplated layer so that it is easy to be wet and corroded, and the hanger, the nail member and the threaded rod are not perpendicularly connected so that the hanger will bend and deform and it causes the object to tilt or drop as the loading is too large.

The fourth way is to use a hanger having an internal thread which is launched by a well-known American brand as shown in FIG. 8. The hanger 71 is additionally welded with a threaded tube 72 having a ¼" UNC thread. The threaded tube 72 has sufficient teeth; however, the manufacturing cost is extremely high, and the area where the nail member 73 is disposed through the hanger 71 and the threaded tube 72 are not arranged on the same axis, so there are shortcomings that need to be improved.

The present invention is, therefore, arisen to obviate or at least mitigate the above-mentioned disadvantages.

SUMMARY OF THE INVENTION

The main object of the present invention is to provide a high-speed gunpowder actuated nail with a toothed tube, which can be applied for screw connection of a threaded rod of small size, and the threaded rod and the nail member are arranged to be perpendicular to each other so that it has high structural strength.

To achieve the above and other objects, a high-speed gunpowder actuated nail with a toothed tube is provided, wherein the high-speed gunpowder actuated nail with the toothed tube includes: a nail member including an outer threaded portion; a tubular member including an inner threaded portion, the inner threaded portion being screwed to the outer threaded portion; an actuating portion mounted to the tubular member; and a percussion cap mounted to an end of the tubular member remote from the nail member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
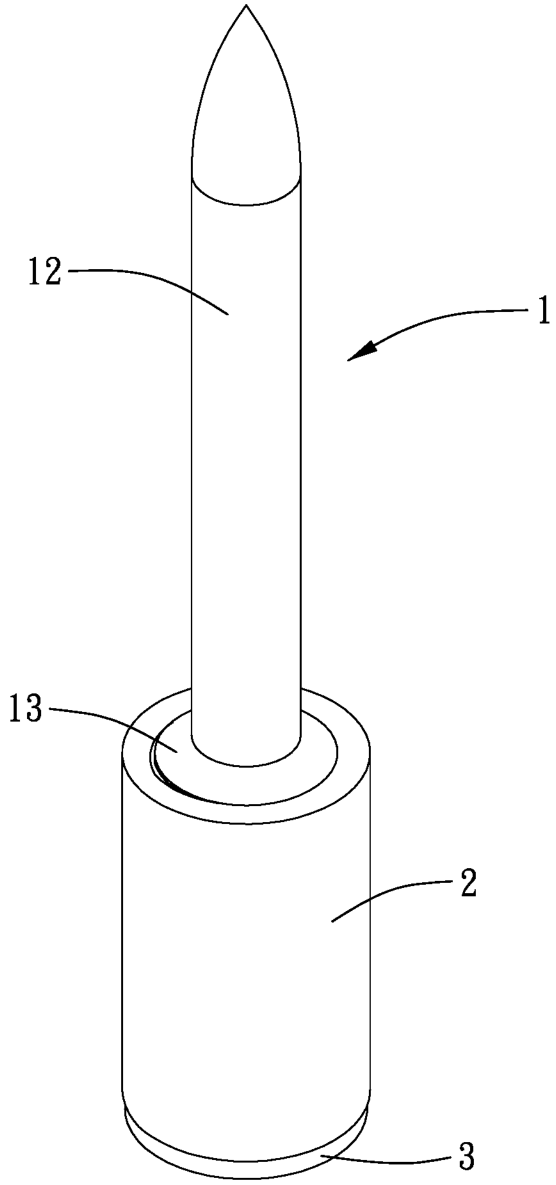
FIG. 1 is a stereogram of an exemplary embodiment of the present invention.
Figure 2:
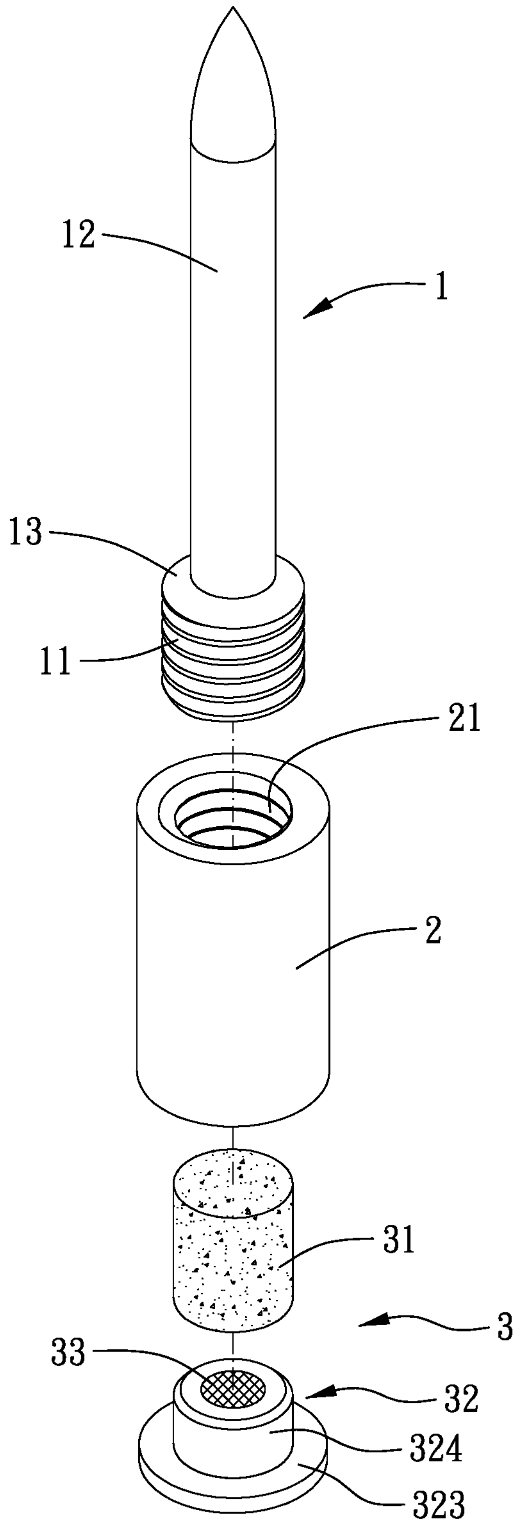
FIGS. 2 and 3 are breakdown drawings of an exemplary embodiment of the present invention.
Figure 3:
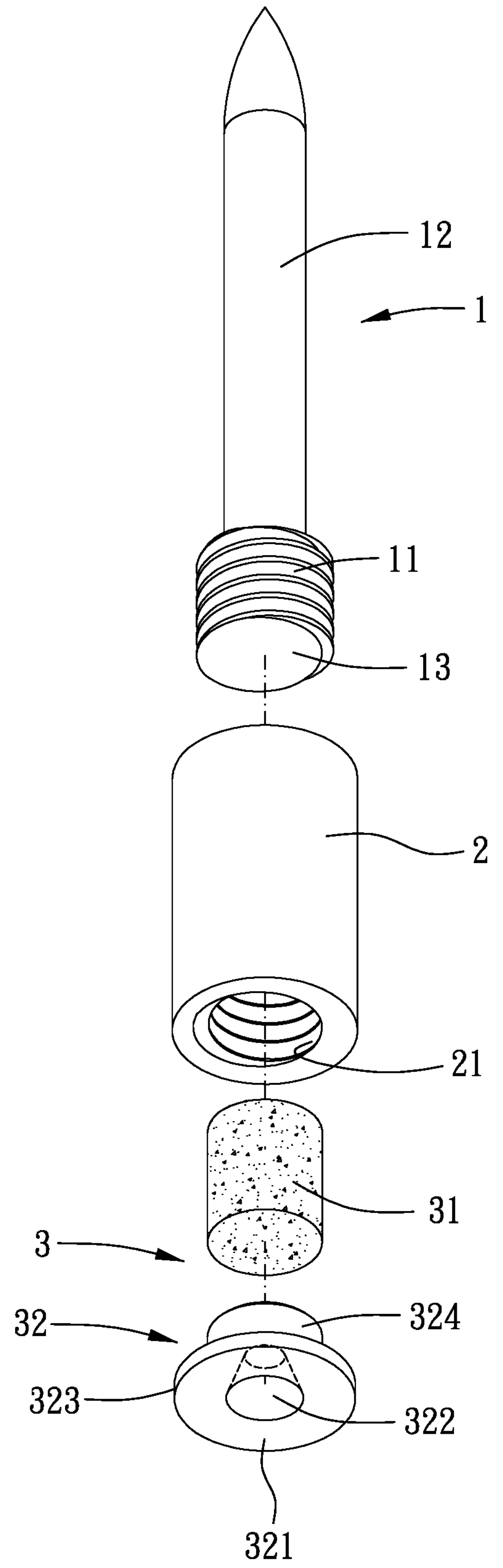
Figure 4:
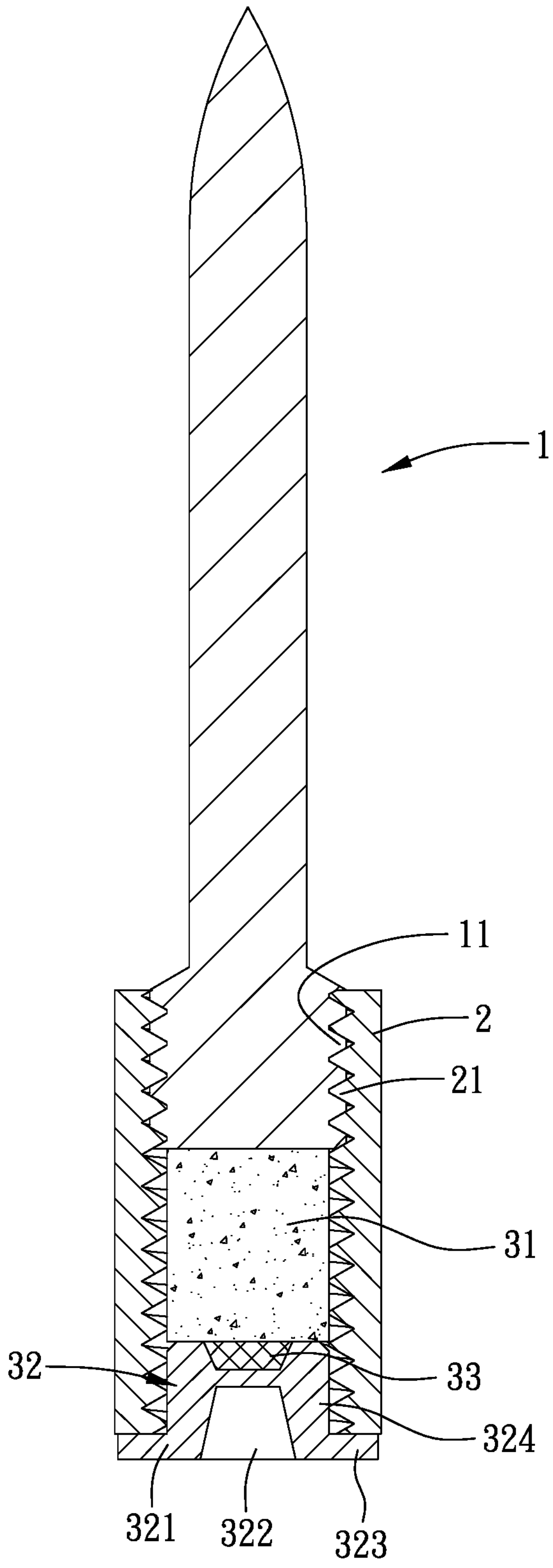
FIG. 4 is a cross-sectional view of an exemplary embodiment of the present invention.

Please refer to FIGS. 1 to 4 for an exemplary embodiment of the present invention. A high-speed gunpowder actuated nail with a toothed tube 1 of the present invention includes a nail member 1, a tubular member 2 and, an actuating portion 3 and a percussion cap 32.

The nail member 1 includes an outer threaded portion 11.

The tubular member 2 includes an inner threaded portion 21, and the inner threaded portion 21 is screwed to the outer threaded portion 11.

The actuating portion 3 is mounted to the tubular member 2.

The percussion cap 32 is mounted to an end of the tubular member remote from the nail member, for achieving moisture-proof effect and preventing the actuating portion 3 from disengaging from the tubular member 2.

Figure 6:
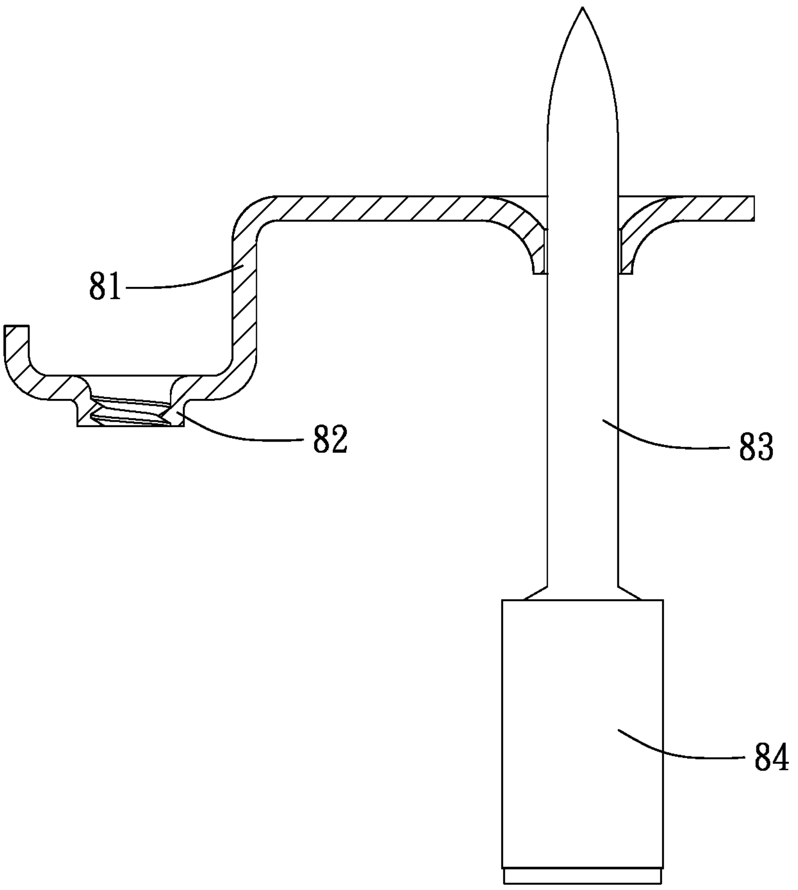
FIG. 6 PRIOR ART
FIG. 6 is a drawing showing a first conventional hanger for a nail according to an exemplary embodiment of the present invention.
Figure 7:
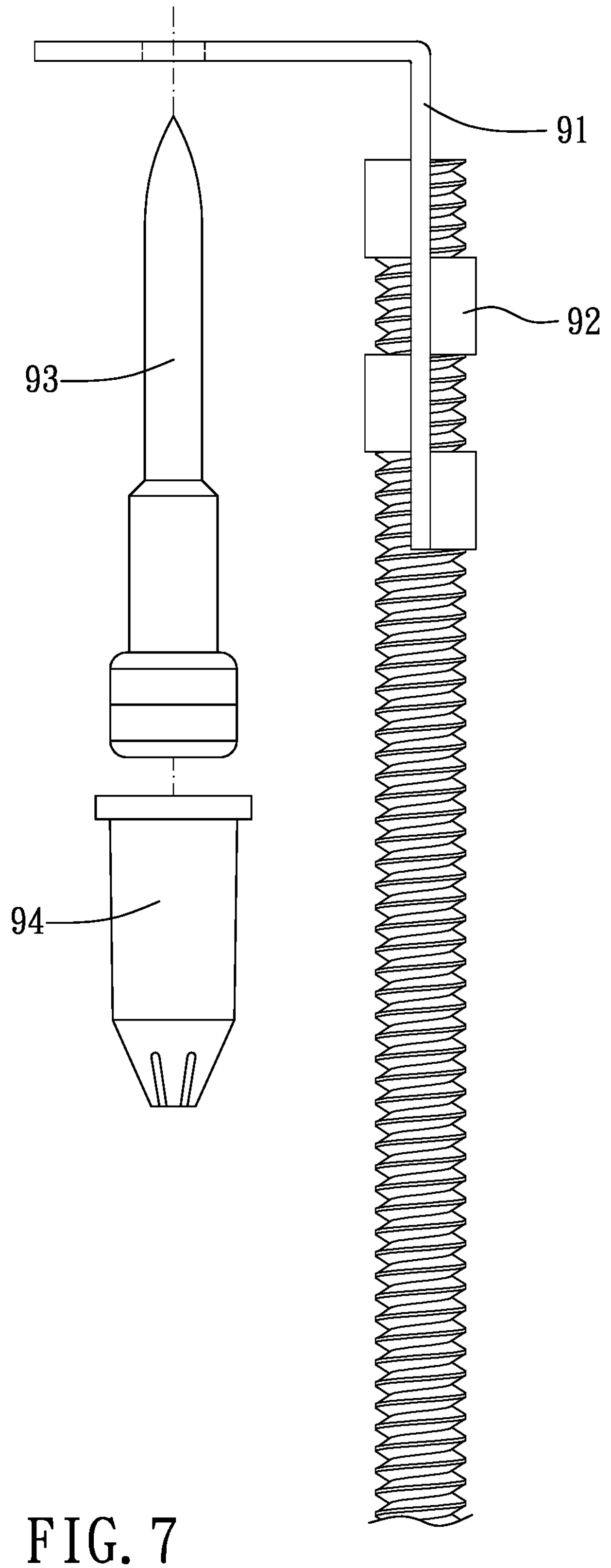
FIG. 7 PRIOR ART
FIG. 7 is a drawing showing a second conventional hanger for a nail according to an exemplary embodiment of the present invention.
Figure 8:
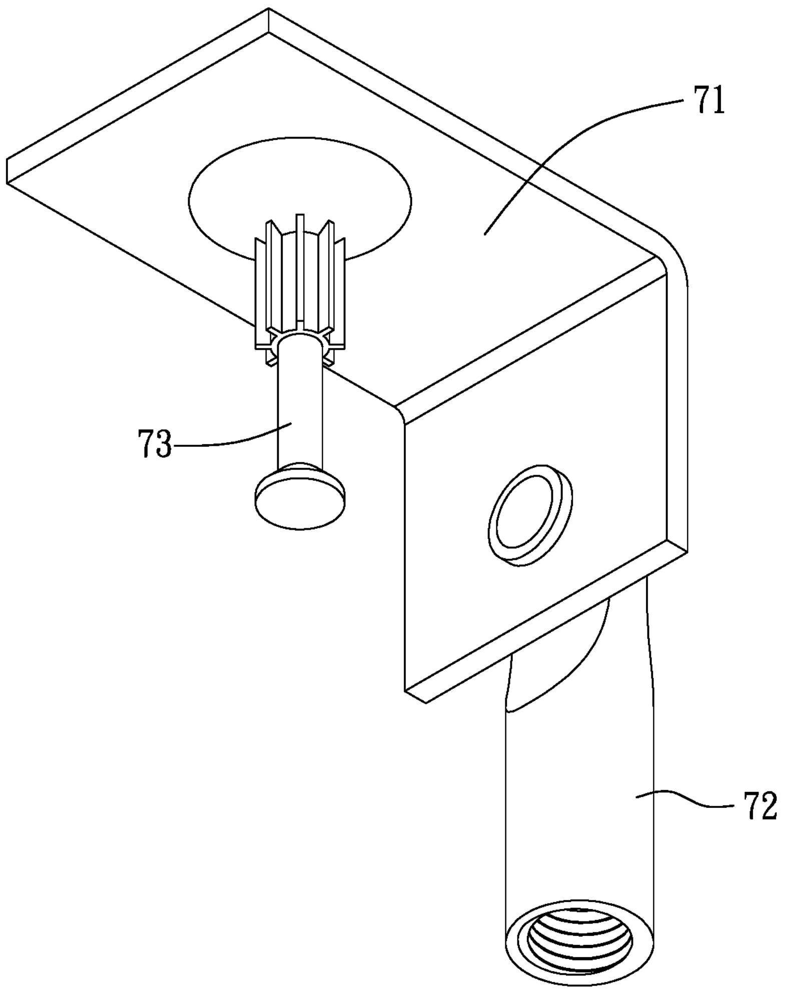
FIG. 8 PRIOR ART
FIG. 8 is a drawing showing a third conventional hanger for a nail according to an exemplary embodiment of the present invention.

As such, it allows to manufacture the nail member 1 and the tubular member 2, and then the tubular member 2 and the nail member 1 are screwed to each other. When the actuating portion 3 is detonated by a nail gun, the nail member 1 is nailed into an object (cement ceiling, for example), the tubular member 2 connected to the nail member 1 provides the inner threaded portion 21 for screw connection of a threaded rod of small size (such as a threaded rod having a ¼" UNC thread or a threaded rod having a thread smaller than M6 thread) to allow installation of an object. The present invention has the following advantages. (1) The inner threaded portion 21 has sufficient teeth and tooth root thickness for the assembling of the toothed rod to meet international standards. (2) The structure is simple, which can save about 63% of steel material. (3) It can save the injection molding equipment, molds and manpower required for the conventional one-piece nail shown in FIG. 6. (4) It reduces the consumption of copper of the conventional copper shell of a power load, or the cost of the power load with plastic barrel. (5) It can save the cost of the punch equipment, molds, manpower for manufacturing the conventional hanger. (6) The overall weight is greatly reduced, which can save transportation costs. (7) The tubular member 2 and the nail member 1 are in a vertical relationship, which can solve the problem of bending of the conventional hanger, and the present invention has high structural strength.

Specifically, the nail member 1 includes a body portion 12 and a head portion 13, the body portion 12 and the head portion 13 are connected to each other, and the head portion 13 includes the outer threaded portion 11. The nail member 1 has a great hardness after quenching, the tubular member 2 is a metal tube, and the tubular member 2 is tapped to form the inner threaded portion 21, which does not need to be quenched so that the manufacturing cost can be reduced.

Preferably, the body portion 12 has a diametric dimension smaller than a diametric dimension of the head portion 13. The tubular member 2 has an axial length larger than an axial length of the head portion 13. In this embodiment, the axial length of the tubular member 2 is larger than two times the axial length of the head portion 13 so that the inner threaded portion 21 has sufficient teeth for a threaded rod to be screwed thereto.

The actuating portion 3 includes a gunpowder propellant 31, the gunpowder propellant 31 is nitrocellulose solid gunpowder or powdered gunpowder, and the gunpowder propellant 31 is received in the tubular member 2. The percussion cap 32 is inserted in and end of the tubular member 2 remote from the nail member 1, which achieves the moisture-proof effect and prevents the gunpowder propellant 31 from getting wet.

Specifically, the percussion cap 32 includes an annular wall 324 and a bottom wall 321, the bottom wall 321 is connected to an end of the annular wall 324 remote from the body portion 12, and a recess 322 is formed on a side of the bottom wall 321 remote from the body portion 12. The percussion cap 32 is a plastic member, and a primer 33 is received in the annular wall 324. The recess 322 can reduce the thickness of the bottom wall 321 so that the striker of the nail gun can ignite the primer 33 effectively. Under normal conditions, it can have a 100% in detonating the gunpowder propellant 31 by the primer 33. The bottom wall 321 includes an annular flange 323, and the annular flange 323 is abutted against an end surface of the tubular member 2 to position the percussion cap 32.

Figure 5:
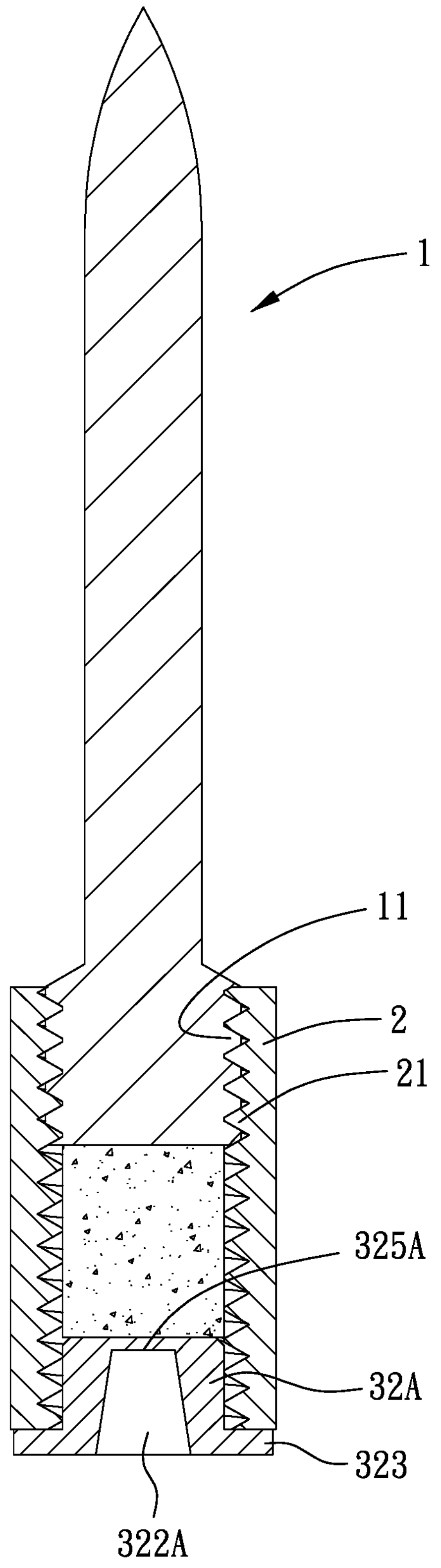
FIG. 5 is another cross-sectional view of another exemplary embodiment of the present invention.

In an alternative embodiment shown in FIG. 5, the percussion cap 32A does not include a primer, and the recess 322A has a large depth and is isolated by a top wall 325A. The gunpowder can be ignited by directly hitting the gunpowder with the striker of the nail gun, which can save the cost of the primer; however, it is preferable for use in an environment which is dry and of low humidity.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A high-speed gunpowder actuated nail with a toothed tube including:

a nail member including an outer threaded portion;

a tubular member including an inner threaded portion, the inner threaded portion being screwed to the outer threaded portion;

an actuating portion mounted to the tubular member; and a percussion cap mounted to an end of the tubular member remote from the nail member;

wherein the nail member further includes a body portion and a head portion, the body portion and the head portion are connected to each other, and the head portion includes the outer threaded portion;

wherein the body portion is located outside the tubular member;

wherein the percussion cap is inserted in the end of the tubular member remote from the nail member, and the percussion cap is engaged radially against a portion of the inner threaded portion.

2. The high-speed gunpowder actuated nail with the toothed tube of claim 1, wherein the body portion has a diametric dimension smaller than a diametric dimension of the head portion.

3. The high-speed gunpowder actuated nail with the toothed tube of claim 2, wherein the axial length of the tubular member is larger than two times the axial length of the head portion; the tubular member is a metal tube; the actuating portion includes a gunpowder propellant, and the gunpowder propellant is received in the tubular member; the percussion cap includes an annular wall and a bottom wall, the bottom wall is connected to an end of the annular wall remote from the body portion, and a recess is formed on a side of the bottom wall remote from the body portion; the bottom wall includes an annular flange, and the annular flange is abutted against an end surface of the tubular member; the percussion cap is a plastic member, and a primer is received in the annular wall; the gunpowder propellant is nitrocellulose solid gunpowder or powdered gunpowder.

4. The high-speed gunpowder actuated nail with the toothed tube of claim 1, wherein the tubular member has an axial length larger than an axial length of the head portion.

5. The high-speed gunpowder actuated nail with the toothed tube of claim 4, wherein the axial length of the tubular member is larger than two times the axial length of the head portion.

6. The high-speed gunpowder actuated nail with the toothed tube of claim 1, wherein the tubular member is a metal tube.

7. The high-speed gunpowder actuated nail with the toothed tube of claim 1, wherein the actuating portion includes a gunpowder propellant, and the gunpowder propellant is received in the tubular member.

8. The high-speed gunpowder actuated nail with the toothed tube of claim 7, wherein the percussion cap includes an annular wall and a bottom wall, the bottom wall is connected to an end of the annular wall remote from the body portion, and a recess is formed on a side of the bottom wall remote from the body portion.

9. The high-speed gunpowder actuated nail with the toothed tube of claim 8, wherein the bottom wall includes an annular flange, and the annular flange is abutted against an end surface of the tubular member.

* * * * *